United States Patent [19]

Speca

[11] Patent Number: 5,552,358
[45] Date of Patent: Sep. 3, 1996

[54] POLYMERIZATION CATALYST SYSTEMS, THEIR PRODUCTION AND USE

[75] Inventor: Anthony N. Speca, Kingwood, Tex.

[73] Assignee: Exxon Chemical Patents Inc., Wilmington, Del.

[21] Appl. No.: 495,770

[22] Filed: Jun. 27, 1995

Related U.S. Application Data

[63] Continuation of Ser. No. 287,322, Aug. 8, 1994, abandoned.

[51] Int. Cl.$^6$ ........................................ B01J 31/00
[52] U.S. Cl. .................... 502/117; 502/111; 502/118; 502/152; 502/156
[58] Field of Search ................................ 502/111, 117, 502/118, 152, 156

[56]   References Cited

U.S. PATENT DOCUMENTS 4,924,018   5/1990   Bottelberghe ............................ 556/179
5,340,786   8/1994   Tsutsui et al. ........................... 502/117

FOREIGN PATENT DOCUMENTS

WO94/07928   4/1994   WIPO .

*Primary Examiner*—Asok Pal
*Assistant Examiner*—E. D. Irzinski
*Attorney, Agent, or Firm*—Jaimes Sher; C. Paige Schmidt

[57]   ABSTRACT

This invention is generally directed toward a supported catalyst system useful for polymerizing olefins. The method for preparing the catalyst system of the invention provides for an optionally supported, metallocene catalyst component which when utilized in a polymerization process exhibits improved reactor operability.

21 Claims, No Drawings

POLYMERIZATION CATALYST SYSTEMS, THEIR PRODUCTION AND USE

This is a continuation, of application Ser. No. 08/287,322, filed Aug. 8, 1994, and now abandoned.

FIELD OF THE INVENTION

This invention relates to catalyst activators, catalyst systems and to methods for their production and use in olefin polymerization. The invention particularly relates to a process for preparing a supported organometallic compound for use in the gas phase, slurry phase or liquid/solution phase with improved reactor operability.

BACKGROUND OF THE INVENTION

It is desirable in many polymerization processes, particularly a slurry phase or gas phase process, to use a supported catalyst. Generally these catalyst systems include a metallocene and alumoxane supported on a carrier, such as silica. For example, U.S. Pat. No. 4,937,217 generally describes a mixture of trimethylaluminum and triethylaluminum added to an undehydrated silica then adding a metallocene catalyst. EP-308177-B1 generally describes adding a wet monomer to a reactor containing a metallocene, trialkylaluminum and undehydrated silica. U.S. Pat. Nos. 4,912,075, 4,935,397 and 4,937,301 generally relate to adding trimethylaluminum to an undehydrated silica and then adding a metallocene to form a dry supported catalyst. U.S. Pat. No. 4,914,253 describes adding trimethylaluminum to undehydrated silica, adding a metallocene and then drying the catalyst. U.S. Pat. Nos. 5,008,228, 5,086,025 and 5,147,949 generally describe forming a dry supported catalyst by the addition of trimethylaluminum to a water impregnated silica to form alumoxane in situ and then adding the metallocene. U.S. Pat. Nos. 4,808,561, 4,897,455 and 4,701,432 describe techniques to form a supported catalyst where the inert carrier, typically silica, is calcined and contacted with a metallocene(s) and a activator/cocatalyst component. U.S. Pat. No. 5,238,892 describes forming a dry supported catalyst by mixing a metallocene with an alkyl aluminum then adding undehydrated silica. U.S. Pat. No. 5,240,894 generally pertains to forming a supported metallocene/alumoxane catalyst system by forming a metallocene/alumoxane reaction solution, adding a porous carrier, and evaporating the resulting slurry to remove residual solvent from the carrier.

While all these supported catalysts are useful it would be desirable to have an improved metallocene catalyst system which in producing polymers does not foul the reactor. Particularly in a slurry or gas phase polymerization process, using these catalyst systems, there is a tendency for reactor operation problems during polymerization. During a typical polymerization process fines within the reactor often accumulate and cling or stick to the walls of a reactor. This phenomenon is often referred to as "sheeting" or "fouling". The accumulation of polymer particles on the reactor surfaces/walls, the recycling lines, distributor plate if employed and cooling system results in many problems including poor heat transfer during the polymerization process. Polymer particles that adhere to the walls of the reactor can continue to polymerize and often fuse together and form chunks, which can be detrimental to continuous and batch polymerization processes.

It would be highly desirable to have an improved polymerization catalyst that in a polymerization process would significantly enhance reactor operability and provide an improved polymer product.

SUMMARY OF THE INVENTION

This invention is generally directed towards a new polymerization catalyst system, to methods for its manufacture and to its use in a polymerization process.

In one embodiment a method is provided to produce a catalyst system by contacting an emulsifier, a proton donor, an activator, a metallocene catalyst component, optionally in the presence of a support material.

In another embodiment a method is provided for producing an improved activator by contacting an emulsifier, a proton donor and an alumoxane compound.

In yet another embodiment of the invention, there is provided a process for producing polyolefins by contacting olefin monomer, optionally with comonomer in the presence of the catalyst system described above.

In still yet another embodiment there is provided a catalyst system produced by the method described above.

DETAILED DESCRIPTION OF THE INVENTION

Introduction

This invention is generally directed toward a catalyst system, particularly a supported catalyst system useful for polymerizing olefins. The method for forming the catalyst system of the invention involves contacting an emulsifier, a proton donor, a metallocene catalyst component or compound and an activator or a cocatalyst.

It has been discovered that in forming the catalyst system of the invention, that using an emulsifier and a proton donor results in an improved alumoxane useful in combination with a metallocene catalyst component to polymerize olefins in a process having a reduced tendency for fouling. The preparation of alumoxane, a commonly used activator for metallocene catalyst component, is typically made by reacting water with an organometallic compound. For example, trimethylaluminum (TMA) is contacted with water to form methylalumoxane (MAO), however, in order to limit over hydrolysis of the MAO, not all the TMA is reacted with water. This excess TMA, which prevents to some extent gel from forming, has been shown to result in an inferior quality MAO, that when combined with a metallocene catalyst component exhibits fouling during polymerization. In order to resolve this problem the MAO and TMA mixture can be post-hydrolyzed by the addition of water to the already formed MAO. One such method involves the use of nitrogen which is passed through a container of water, the nitrogen becomes laden with water vapor which is then bubbled through the MAO and TMA mixture. See for example, U.S. patent application Ser. No. 182,244, filed Jan. 14, 1994, incorporated herein by reference. Although this method is effective it is difficult to control the process, also, fresh liquid toluene must be added intermittently to replace the toluene lost from the solution of MAO and TMA due to evaporation by the nitrogen purge.

The method of the invention for hydrolyzing the activator is to suspend water as microdroplets in an emulsion. For the purposes of this patent specification and appended claims the term "emulsifier" is defined to be a mixture of at least one emulsion forming agent and at least one hydrocarbon liquid. The amount of water added to the emulsifier and the rate of addition can be precisely controlled. Also, another method of controlling the rate of reaction of the water with the organometallic compound can be by choice of the size of the water microdroplet in the emulsion.

Making the catalyst of the invention this way results in a simple, commercially useful and cost effective catalyst system with a reduced tendency for sheeting or fouling in a polymerization reactor.

Catalyst Components of the Invention

Metallocene catalysts, for example, are typically those bulky ligand transition metal compounds derivable from the formula:

$$[L]_m M[A]_n$$

where L is a bulky ligand; A is leaving group, M is a transition metal and m and n are such that the total ligand valency corresponds to the transition metal valency. Preferably the catalyst is four co-ordinate such that the compound is ionizable to a $1^+$ charge state.

The ligands L and A may be bridged to each other, and if two ligands L and/or A are present, they may be bridged. The metallocene compound may be full-sandwich compounds having two or more ligands L which may be cyclopentadienyl ligands or cyclopentadiene derived ligands or half-sandwich compounds having one ligand L, which is a cyclopentadienyl ligand or derived ligand.

The metallocene compounds contain a multiplicity of bonded atoms, preferably carbon atoms, and typically contain a cyclic structure such as, for example, a cyclopentadienyl ligand, substituted or unsubstituted, or cyclopentadienyl derived ligand or any other ligand capable of η-5 bonding to the transition metal atom. One or more bulky ligands may be π-bonded to the transition metal atom. The transition metal atom may be a Group 4, 5 or 6 transition metal and/or a metal from the lanthanide and actinide series. Other ligands may be bonded to the transition metal, such as a leaving group, such as but not limited to hydrocarbyl, hydrogen or any other univalent anionic ligand. Non-limiting examples of metallocene catalysts and catalyst systems are discussed in for example, U.S. Pat. Nos. 4,530,914, 4,952,716, 5,124,418, 4,808,561, 4,897,455, 5,278,119, 5,304,614 all of which are herein fully incorporated by reference. Also, the disclosures of EP-A-0129,368, EP-A-0520732, EP-A-0420436, WO 91/04257 WO 92/00333, WO 93/08221, and WO 93/08199 are all fully incorporated herein by reference.

Various forms of the catalyst system of the metallocene type may be used in the polymerization process of this invention. Exemplary of the development of metallocene catalysts in the art for the polymerization of ethylene is the disclosure of U.S. Pat. Nos. 4,871,705, 4,937,299, 5,324,800, 5,017,714, 5,120,867 and EP-A-0 129 368, all of which are fully incorporated herein by reference. These publications teach the structure of the metallocene catalysts and include alumoxane as the cocatalyst. There are a variety of methods for preparing alumoxane, non-limiting examples of which are described in U.S. Pat. Nos. 4,665,208, 4,952,540, 5,091,352, 5,206,199, 5,204,419, 4,874,734, 4,924,018, 4,908,463, 4,968,827, 5,308,815, 5,248,801, 5,235,081, 5,157,137, 5,103,031 and EP-A-0 561 476, EP-B1-0 279 586, EP-A-0 594-218 and WO 94/10180, all of which incorporated herein by reference.

Further, the metallocene catalyst component of the invention can be a monocyclopentadienyl heteroatom containing compound. This heteroatom is activated by either an alumoxane, an ionizing activator, a Lewis acid or a combination thereof to form an active polymerization catalyst system. These types of catalyst systems are described in, for example, PCT International Publication WO 92/00333, WO 94/07928, and WO 91/04257, WO 94/03506, U.S. Pat. Nos. 5,057,475, 5,096,867, 5,055,438, 5,198,401, 5,227,440 and 5,264,405 and EP-A-0 420 436, all of which are fully incorporated herein by reference. In addition, the metallocene catalysts useful in this invention can include non-cyclopentadienyl catalyst components, or ancillary ligands such as boroles or carbollides in combination with a transition metal. Additionally it is not beyond the scope of this invention that the catalysts and catalyst systems may be those described in U.S. Pat. Nos. 5,064,802, 5,149,819, 5,243,001, 5,239,022, 5,276,208, 5,296,434, 5,321,106 and 5,304,614, PCT publications WO 93/08221 and WO 93/08199 and EP-A-0 578 838 all of which are herein incorporated by reference. It is also within the scope of the invention to combine two or more of any combination of the metallocene catalyst components or catalyst systems described above.

The preferred transition metal component of the catalyst of the invention are those of Group 4, particularly, zirconium, titanium and hafnium. The transition metal may be in any oxidation state, preferably +3 or +4 or a mixture thereof. All the catalyst systems of the invention may be, optionally, prepolymerized or used in conjunction with an additive or scavenging component to enhance catalytic productivity, see for example PCT publication WO 94/07927 incorporated herein by reference.

For the purposes of this patent specification the term "metallocene" is defined to contain one or more unsubstituted or substituted cyclopentadienyl or cyclopentadienyl moiety in combination with a transition metal. In one embodiment the metallocene catalyst component is represented by the general formula $(C_p)_m MR_n R'_p$ wherein at least one $C_p$ is an unsubstituted or, preferably, a substituted cyclopentadienyl ring symmetrical or unsymetrically substituted; M is a Group 4, 5 or 6 transition metal; R and R' are independently selected halogen, hydrocarbyl group, or hydrocarboxyl groups having 1–20 carbon atoms or combinations thereof; m=1–3, n=0–3, p=0–3, and the sum of m+n+p equals the oxidation state of Me.

In another embodiment the metallocene catalyst component is represented by the formulas:

$$(C_5R'_m)_p R''_s (C_5R'_m) MQ_{3-p-x} \text{ or}$$

$$R''_s (C_5R'_m)_2 MQ'$$

wherein M is a Group 4, 5, 6 transition metal, at least one $C_5R'_m$ is a substituted cyclopentadienyl, each R', which can be the same or different is hydrogen, alkyl, alkenyl, aryl, alkylaryl or arylalkyl radical having from 1 to 20 carbon atoms or two carbon atoms joined together to form a part of a substituted or unsubstituted ring or rings having 4 to 20 carbon atoms, R" is one or more of or a combination of a carbon, a germanium, a silicon, a phosphorous or a nitrogen atom containing radical bridging two $(C_5R'_m)$ rings, or bridging one $(C_5R'm)$ ring back to Me, when p=0 and x=1 otherwise "x" is always equal to 0, each Q which can be the same or different is an aryl, alkyl, alkenyl, alkylaryl, or arylalkyl radical having from 1 to 20 carbon atoms, halogen, or alkoxides, Q' is an alkylidene radical having from 1–20 carbon atoms, s is 0 or 1 and when s is 0, m is 5 and p is 0, 1 or 2 and when s is 1, m is 4 and p is 1.

For the purposes of this patent specification, the terms "cocatalysts" and "activators" are used interchangeably and are defined to be any compound or component which can activate a metallocene catalyst compound, as defined above. It is within the scope of this invention to use alumoxane as an activator, and in combination, to also use ionizing activators, neutral or ionic, or compounds such as tri(n-butyl)ammonium tetra bis(pentaflurophenyl)boron, which ionize the neutral metallocene compound. Such ionizing compounds may contain an active proton, or some other cation associated with but not coordinated or only loosely coordinated to the remaining ion of the ionizing compound. Such compounds and the like are described in EP-A-0520 732, EP-A-500 944, EP-A-0 277 003 and EP-A-0 277 004, and U.S. Pat. Nos. 5,153,157, 5,198,401, 5,241,025 and 5,278, 119 are all herein fully incorporated by reference. Combinations of activators are also contemplated by the invention, for example, alumoxane and ionizing activators in combinations, see for example, WO 94/07928.

It is well established in the art the reaction of a trialkylaluminum compound and water, within or added to a support material or simply just added to the aluminum compound, results in a hydrolysis reaction to form a cocatalyst, alumoxane. Hydrolysis is a well known procedure in the art, see for example, EP-A-03542, EP-A-108 339, EP-A-299 391, EP-A-315 234, EP-A-200 351, EP-A-328 348, and EP-A-360 492.

In one embodiment the invention is contacted with an emulsifier and a proton donor. A proton donor, for example, is any compound containing an acidic hydrogen atom, such as water and, Bronsted acid, preferably Bronsted acids having a $pK_a$ less than or equal to 15, preferably less than 12, and most preferably less than 10.

In one preferred embodiment the cocatalyst or activator is an oxy containing organometallic compound. In a more preferred embodiment the organometallic compound can be represented by the following formula:

(R—Al—O)$_n$ which is a cyclic compound and

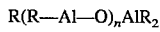

R(R—Al—O)$_n$AlR$_2$ which is a linear or non-cyclic compound and mixtures thereof including multi-dimensional structures. In the general formula R is a $C_1$ to $C_{12}$ alkyl, group such as for example methyl, ethyl, propyl, butyl, pentyl, hexyl, octyl, nonyl and n is an integer from about 1 to 20. The most preferred oxy containing organometallic compounds are alumoxanes, for example methyl alumoxane and/or ethylalumoxane. It is known in the art to make alumoxanes, see for example U.S. Pat. Nos. 4,530,914 and 4,952,716 incorporated herein by reference.

Typically when producing a cocatalyst or activator of the invention the cocatalyst or activator is formed from an organometallic compound. Once made the cocatalyst or activator comprises the cocatalyst or activator compound and some of the starting organometallic compounds from which the cocatalyst or activator was initially made.

The organometallic compounds are from those compounds of Group 1, 2, 3 and 4 organometallic alkyls, alkoxides, and halides. The preferred organometallic compounds are lithium alkyls, magnesium alkyls, magnesium alkyl halides, aluminum alkyls, silicon alkyl, silicon alkoxides and silicon alkyl halides. The more preferred organometallic compounds are aluminum alkyls and magnesium alkyls. The most preferred organometallic compounds are aluminum alkyls, for example, triethylaluminum (TEAL), trimethylaluminum (TMA), tri-isobutylaluminum (TIBAL) and tri-n-hexylaluminum (TNHAL) and the like. For example, where trimethylaluminum is being used to form methylalumoxane the resulting methylalumoxane mixture also contains some trimethylaluminum.

It has been discovered that reducing the mole ratio of the organometallic compound to the activator from which the activator is made is beneficial to producing the catalyst system of the invention.

In one embodiment the mole ratio of PD/OM is typically in the range of from about 0.05 to about 1.05, preferably in the range of about 0.07 to about 0.4 more preferably in the range of about 0.1 to about 0.3 and most preferably from about 0.1 to about 0.2, where PD is a proton donor and OM is the organometallic compound.

In the preferred embodiment the activator compound is methylalumoxane (MAO) which is made from TMA where water ($H_2O$) is used as the proton donor such that the mole ratio of $CH_3/Al$ is less than 1.6, preferably less than 1.59 and most preferably less than 1.58, where $CH_3$ is a methyl group. The Al content was measured by ICPES, a technique well known in the art. The $CH_4$, methane gas, was measured by gas evolution, a technique also well known in the art. When the alumoxane and the proton donor, for example water, $H_2O$, contact each other, methane gas is released. As a result of this production of $CH_4$ gas the resulting alumoxane contains fewer carbon-aluminum bonds and more aluminum-oxygen bonds.

Typically when MAO is formed initially or purchased from a supplier it can contain gels. In one embodiment it is preferable that the activator is "substantially free of gels." Gels can be removed by any method known in the art, for example, decantation or filtration.

For purposes of this patent specification the terms "carrier" or "support" are interchangeable and can be any support material, preferably a porous support material, such as for example, talc, inorganic oxides, inorganic chlorides, for example magnesium chloride and resinous support materials such as polystyrene polyolefin or polymeric compounds or any other organic support material and the like.

The preferred support materials are inorganic oxide materials, which include those from the Periodic Table of Elements of Groups 2, 3, 4, 5, 13 or 14 metal oxides. In a preferred embodiment, the catalyst support materials include silica, alumina, silica-alumina, and mixtures thereof. Other inorganic oxides that may be employed either alone or in combination with the silica, alumina or silica-alumina are magnesia, titania, zirconia, and the like.

It is preferred that the carrier of the catalyst of this invention has a surface area in the range of from about 10 to about 700 m$_2$/g, pore volume in the range of from about 0.1 to about 4.0 cc/g and average particle size in the range of from about 10 to about 500 μm. More preferably, the surface area is in the range of from about 50 to about 500 m$^2$/g, pore volume of from about 0.5 to about 3.5 cc/g and average particle size of from about 20 to about 200 μm. Most preferably the surface area range is from about 100 to about 400 m$^2$/g, pore volume from about 0.8 to about 3.0 cc/g and average particle size is from about 30 to about 100 μm. The pore size of the carrier of the invention typically has pore size in the range of from 10 Å to 1000 Å, preferably 50 Å to about 500 Å, and most preferably 75 Å to about 350 Å.

Emulsion forming agent is any compound capable of forming a suspension of two or more immiscible liquids. Non-limiting examples of emulsion forming agents useful in this present invention include protein or carbohydrate polymers, known as protective colloids, long-chain alcohols and fatty acids, for example soaps or detergents. See the Handbook of Industrial Surfactants, compiled by Michael and Irene Ash, Gower, 1994 for examples of emulsion forming agents useful in this invention. One of ordinary skill in the art will recognize that only those emulsion forming agents compatible with the activator should be used.

Method of Producing the Catalyst System of the Invention

The catalyst system of the invention can be made in a variety of different ways.

In one embodiment the catalyst system is made by simply combining an emulsifier, a proton donor, an activator and a metallocene catalyst component in any desired order. It is preferred to combine the emulsifier, the proton donor and the activator prior to introducing the metallocene catalyst component.

In another embodiment a support material is introduced to any of the above methods.

In one embodiment of the invention the weight ratio of the proton donor to the hydrocarbon liquid of the emulsifier is in the range from about 0.001 to 0.1, preferably 0.005 to 0.05, and most preferably about 0.008 to 0.01.

In another embodiment of the invention the weight ratio of the proton donor to the emulsion forming agent of the emulsifier is in the range of 0.1 to 20, preferably 0.5 to about 10, and most preferably about 1 to 5.

In preparing the catalyst system of the invention the emulsifier (emulsion forming agent and hydrocarbon liquid) it is preferred that when adding the proton donor the microdroplets formed (proton donor and hydrocarbon liquid) have a size typically in the range of from about 50 Å to 15,000 Å, preferably about 100 Å to about 10,000 Å (1µ), and most preferably about 200 Å to about 5000 Å. Those skilled in the art will recognize that varying the amount of agitation can affect the size of the microdroplets.

In another embodiment of the invention, when adding the emulsifier to the activator it is preferable that the activator (activator and hydrocarbon liquid) be in a temperature range of about −30° C. to about 30° C., preferably −15° C. to 15° C., and most preferably −5° C. to about 5° C.

In yet another embodiment of the invention, after adding the emulsifier to the activator the metallocene can be added at any temperature to the emulsifier and activator mixture, preferably the metallocene is added to the mixture at room temperature, about 20° C. to about 25° C.

In the most preferred embodiment the emulsifier and a proton donor are added to the activator to form a first mixture to which the metallocene catalyst component is added to form a second mixture, the second mixture is then added to a support material or vice-versa. It is preferred to remove any gels that form when combining the emulsifier, the proton donor and the activator. In one embodiment, the ratio of the total volume of the second mixture to the total pore volume of the support material, preferably a porous support material, is in the range of 5:1 to 0.5:1, preferably 2.5:1 to 0.8:1, even more preferably 2:1 to 0.8:1, and most preferably from 1:1 to 0.85:1.

The procedure for measuring the total pore volume of a porous support is well known in the art. Details of one of these procedures is discussed in Volume 1, *Experimental Methods in Catalytic Research* (Academic Press, 1968) (specifically see pages 67–96). This preferred procedure involves the use of a classical BET apparatus for nitrogen absorption. Another method well know in the art is described in Innes, *Total porosity and Particle Density of Fluid Catalysts By Liquid Titration*, Vol. 28, No. 3, Analytical Chemistry 332–334 (March, 1956).

It is contemplated by this invention that typically at least one compatible liquid is used in the formulation of the catalyst system of the invention. These liquids can be any compatible solvent, a hydrocarbon liquid such as those aliphatic, aromatic, saturated hydrocarbons and cyclic hydrocarbons such as isopentane, heptane, toluene and the like and any other compatible liquid. The aromatic hydrocarbons are preferred, for example, toluene.

In one embodiment the emulsifier is removed by filtration or decantation techniques as is well known in the art.

The catalyst system of the invention can be used in liquid or slurry form or dried to a free-flowing powder. As a free flowing powder the catalyst system of the invention can still contain an amount of solvent, for example, toluene, in the support pores, however, it is preferred that substantially all the solvent is removed.

It is within the scope of the invention to separately support at least one metallocene on a porous support and support at least one hydrolyzed activator of the invention on another porous support.

In another embodiment of the invention, the mole ratio of the metal of the activator component to the transition metal of the metallocene component is in the range of ratios between 0.3:1 to 1000:1, preferably 20:1 to 800:1, and most preferably 50:1 to 500:1.

It is within the scope of this invention to wash the catalyst system of the invention in a liquid, such as hexane, after its formation to remove excess activator and then dry the catalyst system to remove any excess liquid.

In another embodiment where the activator is an ionizing activator as previously described the mole ratio of the metal of the activator component to the transition metal component is in the range of ratios between 0.3:1 to 3:1.

In another embodiment of the invention, the supported catalyst system of the invention includes an antistatic agent, for example, those described in U.S. Pat. No. 5,283,278, fully incorporated herein by reference. Non-limiting examples of antistatic agents include, alcohol, thiol, silanol, diol, ester, ketone, aldehyde, acid, amine, and ether compounds. Tertiary amine compounds are preferred. The antistatic agent can be added at any stage in the formation of the catalyst system of the invention, however, it is preferred that it is added after the supported catalyst system of the invention is formed, in either a slurry or dried state.

Polymerization Process of the Invention

The catalyst system of this invention is suited for the polymerization of monomers and optionally comonomers in any polymerization or prepolymerization process, gas, slurry or solution phase; even a high pressure autoclave process can be utilized. In the preferred embodiment a gas phase or slurry phase process is utilized, most preferably a gas phase process is used. (See for example U.S. Pat. Nos. 4,543,399, 4,588,790, 5,028,670 and U.S. patent application Ser. No. 053,067, filed Apr. 26, 1993, all of which are fully incorporated herein by reference.)

In the preferred embodiment, this invention is directed toward the slurry or gas phase polymerization or copolymerization reactions involving the polymerization or optionally prepolymerization of one or more of the alpha-olefin monomers having from 2 to 20 carbon atoms, preferably 2–12 carbon atoms. The invention is particularly well suited to the copolymerization reactions involving the polymerization of one or more of the monomers, for example alpha-olefin monomers of ethylene, propylene, butene-1, pentene-1, 4-methylpentene-1, hexene-1, octene-1, decene-1, and cyclic olefins and styrene. Other monomers can include polar vinyl, diolefins such as dienes, norbornene, norboradiene, acetylene and aldehyde monomers. Preferably a copolymer of ethylene or propylene is produced. Preferably the comonomer is an alpha-olefin having from 3 to 15 carbon atoms, preferably 4 to 12 carbon atoms and most preferably 4 to 10 carbon atoms. In another embodiment ethylene or propylene is polymerized with at least two comonomers to form a terpolymer and the like.

In one embodiment of the process of the invention, the olefin(s) are prepolymerized in the presence of the catalyst system of the invention prior to the main polymerization. The prepolymerization can be carded out batchwise or continuously in gas, solution or slurry phase including at elevated pressures. The prepolymerization can take place with any alpha-olefin monomer or combination and/or in the presence of any molecular weight controlling agent such as hydrogen. For details on prepolymerization see U.S. Pat. Nos. 4,923,833 and 4,921,825 and EP-B-0279 863, published Oct. 14, 1992 all of which are incorporated fully herein by reference.

Polymer Compositions and Applications of the Invention

The MIR of the polymers of this invention are generally in the range of greater than 10 to about 200, preferably about 12 to 60 and most preferably about 14 to about 45.

The ethylene homopolymer and copolymer compositions of the invention have a density in the range of from about 0.86 g/cm$^3$ to about 0.97 g/cm$^3$, preferably about 0.88 g/cm$^3$ to about 0.96 g/cm$^3$, more preferably between about 0.90 g/cm$^3$ to about 0.955 g/cm$^3$ and most preferably between about 0.91 g/cm$^3$ to about 0.95 g/cm$^3$.

The MWD of the polymers of the invention are in the range of greater than about 1.8 to less than about 20, preferably in the range of greater than about 2 to about 6.

The polymers of the present invention in one embodiment have CDBI's generally in the range of greater than 50% to 99%, preferably in the range of 50% to 85%, and more preferably 55% to 80%, even more preferably greater than 60%, still even more preferably greater than 65%. Obviously, higher or lower CDBI's may be obtained using other catalyst systems with changes in the operating conditions of the process employed. Further details for determining the CDBI of a copolymer is described in PCT Patent Application WO 93/03093, published Feb. 18, 1993.

In some instances where it is necessary to improve processability and manipulate final end product characteristics the polymers produced by this present invention can be blended or coextruded into single or multilayer films or the like with various other polymers and compounds well known in the art, for instance, LLDPE, LDPE, high and low high density polyethylene, polypropylene, PB, EMA, EVA, SBS, and copolymers of acrylic acid and combinations thereof.

In many applications it will desirable to combine the polymer of the invention with anti-oxidants, slip, anti-block, processing aids, pigments, ultra-violet inhibitors, antistatic agents, or other additives. The polymers produced by the process of the invention are useful in such forming operations as film, sheet, and fiber extrusion and co-extrusion as well as blow molding, injection molding and rotary molding. Films include blown or cast films in mono-layer or multi-layer constructions formed by coextrusion or by lamination. Such films are useful as shrink film, cling film, stretch film, sealing films, oriented films, snack packaging, heavy duty bags, grocery sacks, baked and frozen food packaging, medical packaging, industrial liners, membranes, etc. in food-contact and non-food contact applications. Fiber forming operations include melt spinning, solution spinning and melt blown fiber operations. Such fibers may be used in woven or non-woven form to make filters, diaper fabrics, medical garments, geotextiles, etc. General extruded articles include medical tubing, wire and cable coatings, geomembranes, and pond liners. Molded articles include single and multi-layered constructions in the form of bottles, tanks, large hollow articles, rigid food containers and toys, etc. Polymers of the invention can also be used as lubricants, for use in motor oils, gasoline or the like.

EXAMPLES

Example 1

Preparation of the Activator of the Invention

In this experiment the emulsion forming agent used was sorbitol monooleate, trade name SPAN-80, commercially available from ICI Specialties, Wilmington, Del. The emulsifier was prepared by adding SPAN-80 (0.205 g) (also known as a surfactant) to toluene (49.8 g) in a small bottle. The emulsion forming agent was totally miscible in the toluene. Deionized water (0.387 g) was added all at once followed by rapid mechanical stirring. The result was a milky emulsion. Such emulsions are stable for weeks with no evidence of water separation. The 10 wt % MAO in toluene solution (140 mL) (available from Schering, Corp., Bloomfield, N.J.) was cooled to 0° C. under mechanical stirring. All of the emulsion prepared above was added incrementally over 2.2 hours. Amounts were small enough to keep the temperature in the range of 0°–3° C. With each addition the MAO solution became slightly cloudy and cleared in 3–5 minutes. After addition the solution was kept at 0°–2° C. for one hour then heated to 40° C. over 1.5 hours. After a hold of 1 hour the heat was removed. All of the Al was recovered as MAO. Al content was 1.35 mM Al/cc by ICPES with CH$_3$/Al of 1.58±0.26 measured by gas evolution. The MAO produced in this example is identified in Table 1 by the letter "A".

Example 2

29.5 cc of activator A of Example 1 (40 mM Al) and 0.115 g of (1,3-methylbutylCp)$_2$ZrCl$_2$ (0.265 mM Zr) were combined under stirring until the metallocene was dissolved. The resulting solution was added to 5 g of MS3040 silica (commercially available from Philadelphia Quartz, Philadelphia, Pa.) described above under stirring. After one hour stirring the slurry was dried in vacuo at 50°–55° C. to a free flowing powder.

Comparative Example 1

10 wt % MAO available from Schering Corp., Bloomfield, N.J. and (1,3-methylbutylCp)$_2$ZrCl$_2$ (150 Al/Zr) in toluene were added to 5 g of MS3040 silica described above under stirring. The loading was 0.053 mM Zr per g silica. After one hour stirring the slurry was dried in vacuo at 50°–55° C. to a free flowing powder. The MAO used in this example is identified in Table 1 by the letter "B".

POLYMERIZATION TEST (CONDITION 1)

To a 2 liter autoclave reactor was added 800 cc of isobutane, 0.468 mM triethylaluminum, and 60 cc of hexene-1. 0.10 g of the catalyst was added to a charge tube which was attached to the reactor. With the reactor at 85° C., ethylene was added through the charge tube to raise reactor pressure to 2345 kPa. Ethylene was fed to the reactor to maintain this pressure and polymerization continued. At the end of 40 minutes heating was stopped, ethylene feed was blocked and the reactor was vented. The reactor was opened and inspected. The polymer was collected and then dried.

POLYMERIZATION TEST (CONDITION 2)

To a 2 liter autoclave reactor was added 800 cc of hexane, 0.453 mM triethylaluminum, and 30 cc of hexene-1. 0.125 g of the catalyst was added to a charge tube which was attached to the reactor. With the reactor at 70° C., ethylene was added through the charge tube to raise reactor pressure to 1140 kPa. Ethylene was fed to the reactor to maintain this pressure and polymerization continued. At the end of 40 minutes heating was stopped, ethylene feed was blocked and the reactor was vented. The reactor was opened and inspected. The polymer was collected and then dried.

TABLE 1

| ACTIVATOR CHARACTERISTICS | | |
| --- | --- | --- |
|  | METHOD | $CH_3/Al$** |
| Example 1 | A | 1.58 ± 0.026 |
| Comparative Example 1 | B | 1.87 ± 0.011 |

**Represents the statistical average of at least three determinations.

TABLE 2

| POLYMERIZATION RESULTS | | | | |
| --- | --- | --- | --- | --- |
| CATALYST EXAMPLE | METHOD | POLY-MER-IZATION CONDI-TIONS | PE MADE (g) | FOULING |
| Example 2 | A | 1 | 109 | Light |
| Comparative Example 1 | B | 1 | 89 | Heavy |
| Example 2 | A | 2 | 49 | None |
| Example 2 | A | 2 | 42 | Light |
| Comparative Example 1 | B | 2 | * | Heavy |

*Temperature control lost, polymerization test stopped due to poor operability.

Chemical properties of the MAO's used are shown in Table 1. The $CH_3/Al$ molar ratio of the starting MAO was reduced from 1.85 to 1.58.

Slurry polymerization data are shown in Table 2. The method by which the MAO was produced and the polymerization condition as well as the preparation of the catalyst system is shown in Table 2. It is apparent that catalyst system of Comparative Example 1 prepared with MAO as received from the manufacturer is undesirable because of the heavy fouling which occurs under both polymerization Conditions 1 and 2. Example 2 shows using the reduced fouling tendencies of the catalyst system of the invention.

While the present invention has been described and illustrated by reference to particular embodiments, it will be appreciated by those of ordinary skill in the art that the invention lends itself to variations not necessarily illustrated herein. For example, it is within the scope of this invention to mix at least two of the catalysts of the invention or to use the catalyst of the invention with any other catalyst or catalyst system known in the art, for example a traditional Ziegler-Natta catalyst or catalyst system. Also the catalyst system of the invention can be used in a single reactor or in a series reactor. For this reason, then, reference should be made solely to the appended claims for purposes of determining the true scope of the present invention.

What is claimed is:

1. A method for producing a catalyst system comprising contacting an emulsifier comprising a hydrocarbon liquid and an emulsion forming agent, a proton donor, an alumoxane activator and a metallocene catalyst component.

2. The method of claim 1 wherein the method further comprises introducing a support material.

3. The method of claim 1 wherein the proton donor is at least one Bronsted acid.

4. The method of claim 1 wherein the proton donor to a hydrocarbon liquid of the emulsifier is in a weight ratio in the range of from 0.1 to about 20.

5. The method of claim 1 wherein the proton donor to an emulsion forming agent of the emulsifier is in a weight ratio in the range from 0.1 to about 20.

6. The method of claim 1 wherein the activator is methylalumoxane and the proton donor is water.

7. The method of claim 1 wherein the proton donor is first added to the emulsifier to produce microdroplets having a size of about 50 Å to about 15,000 Å.

8. The method of claim 1 wherein the emulsifier and the proton donor are combined first followed by the contacting with the activator.

9. The method of claim 1 wherein the emulsifier and the proton donor are combined first followed by the contacting of the metallocene catalyst component and then the activator.

10. The method of claim 1 wherein the activator and the metallocene catalyst are combined to form a mixture prior to contacting the mixture with the emulsifier and the proton donor.

11. A method for producing a catalyst system, said method comprising the steps of:
   a) contacting at least one emulsifier with at least one proton donor;
   b) introducing at least one alumoxane activator; and
   c) adding at least one metallocene catalyst component.

12. The method of claim 11 wherein said method further comprises introducing a support material.

13. The method of claim 11 wherein the emulsion forming agent of the emulsifier is selected from the group consisting of protective colloids, long-chain alcohols, and fatty acids.

14. The method of claim 11 wherein the activator is methylalumoxane.

15. A method for producing a catalyst system comprising the steps of:
   a) introducing at least one emulsifying agent, a hydrocarbon liquid and a proton donor to form a first component;
   b) adding to the first component an activator comprising an alumoxane solution to form a second component; and
   c) combining the second component with a metallocene catalyst component.

16. The method of claim 15 wherein the method further comprises combining a support material with the second component and metallocene catalyst component.

17. The method of claim 15 wherein the activator is methylalumoxane.

18. The method of claim 17 wherein the second component has a mole ratio of $CH_3/Al$ less than 1.6.

19. A method for producing a catalyst system comprising combining an emulsifier with water and alumoxane to form a hydrolyzed alumoxane; removing of the emulsifier from the hydrolyzed alumoxane, and introducing a metallocene catalyst component.

20. The method of claim 19 wherein the hydrolyzed alumoxane is methyl alumoxane having a mole ratio of $CH_3/Al$ of less than 1.6.

21. A method for producing a catalyst system comprising the steps of:

a) hydrolyzing an alumoxane activator in a mixture comprising an emulsifier and a proton donor; and b) combining the hydrolyzed activator with a metallocene catalyst component and support material.

* * * * *